(No Model.)

J. M. JOHNSTON.
DAMPENING MACHINE.

No. 398,333. Patented Feb. 19, 1889.

Witnesses:
J. N. Cooke
John Cobbett

Inventor.
Joseph M. Johnston
By James I. Kay
Attorneys

UNITED STATES PATENT OFFICE.

JOSEPH M. JOHNSTON, OF ALLEGHENY, PENNSYLVANIA.

DAMPENING-MACHINE.

SPECIFICATION forming part of Letters Patent No. 398,333, dated February 19, 1889.

Application filed February 16, 1888. Serial No. 264,215. (No model.)

*To all whom it may concern:*

Be it known that I, JOSEPH M. JOHNSTON, a resident of Allegheny, in the county of Allegheny and State of Pennsylvania, have invented a new and useful Improvement in Dampening-Machines; and I do hereby declare the following to be a full, clear, and exact description thereof.

My invention relates to laundry machinery, and more especially to a machine for dampening collars, cuffs, and shirts, its object being to provide a machine in which the articles will be dampened uniformly the proper amount, so as not to blister when they are passed through the burnishing rolls or irons.

My invention consists in certain improvements, which will be hereinafter particularly described and claimed.

To enable others skilled in the art to make and use my invention, I will describe the same more fully, referring to the accompanying drawings, in which—

Figure 1:
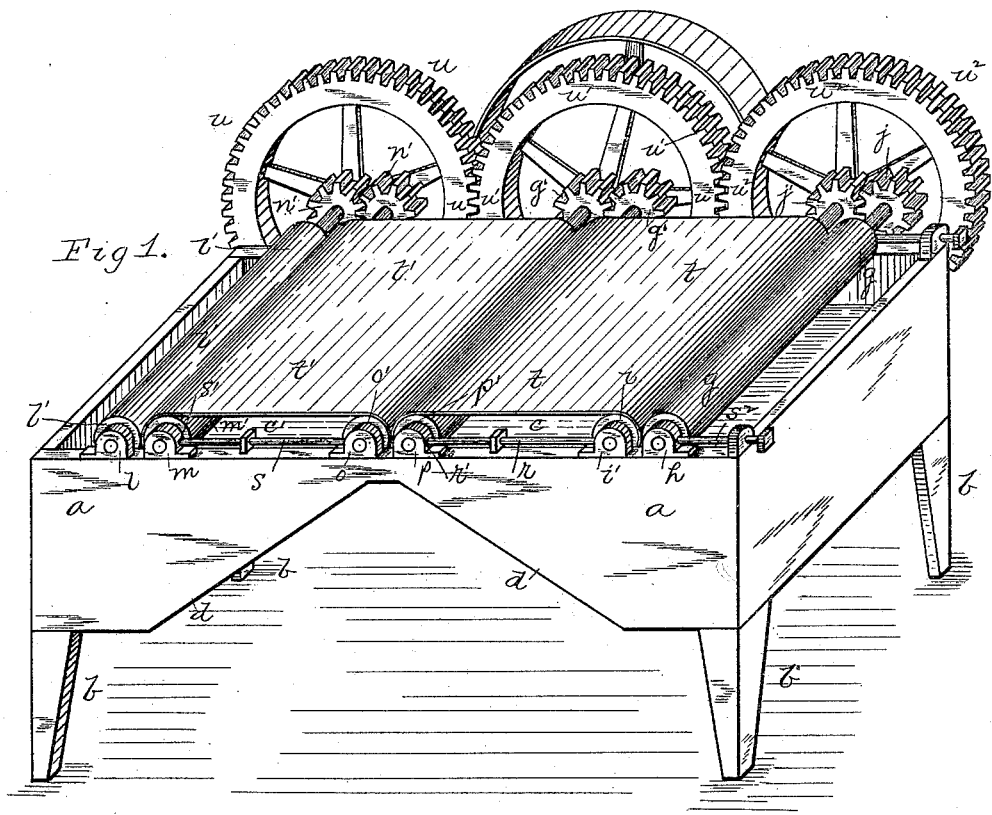
Figure 2:
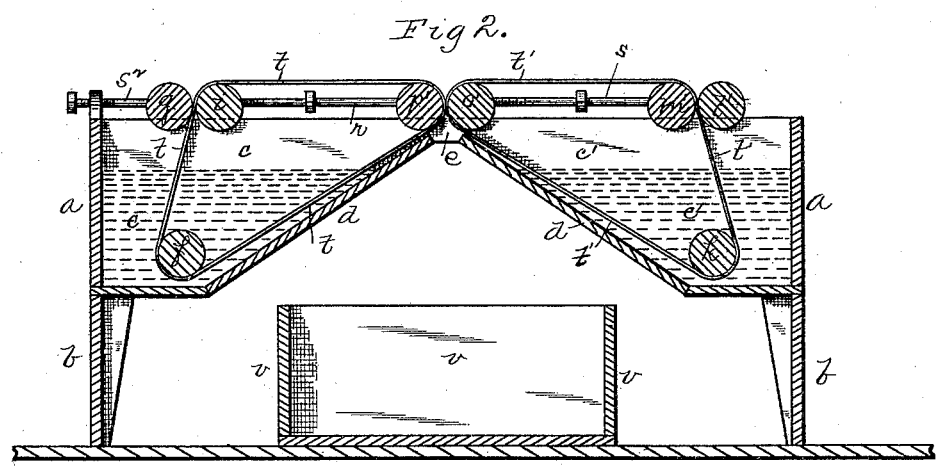

Figure 1 is a perspective view of my improved machine, and Fig. 2 is a longitudinal central section of the same.

Like letters refer to like parts.

In constructing my improved machine a body, $a$, is mounted on suitable legs, $b$, and tanks $c\ c'$, one of which is formed in or secured to each end of the body $a$, these tanks being for the purpose of holding the water or other fluid employed to dampen the collars or cuffs, and they are provided with suitable inlets and outlets for said fluid. The inside wall, $d$, of each of these tanks is preferably inclined inward, so that they extend toward each other; but they do not meet, a lateral slot or opening, $e$, being left in the center of the body $a$ of the machine, through which opening the collars or other articles pass as they come from the dampening-surfaces, hereinafter described.

Journaled in the bottom of the tank $c$ is a roller, $f$, and mounted on the body $a$, over said roller $f$, is journaled in sliding bearings $h$ a roller, $g$, and parallel to and back of the roller $g$ is another roller, $i$, in stationary bearings $i'$, these two rollers being geared together by pinions $jj'$, which allow a certain amount of movement toward and from each other, for the purpose hereinafter set forth. In the bottom of the tank $c'$ is also journaled a roller, $k$, and over said roller on the frame $a$, in fixed bearings $l$, is journaled a roller, $l'$, and front of said roller $l'$ and parallel thereto is mounted in sliding bearings $m$ another roller, $m'$, the latter being adjusted toward the roller $l'$ by a screw, $s$, which bears at one end against a stationary bearing, $o$, and passing at its opposite end through a screw-threaded hole, $s'$, so that by turning the screw the roll $m'$ may be adjusted to and from the roller $l'$. The rollers $l'$ and $m'$ are geared together by pinions $n'$, so that they will be properly driven.

Mounted on the body $a$ on one side of the slot $e$ in the fixed bearings $o$ is a roller, $o'$, and on the other side of the slot $e$ is mounted in sliding bearings $p$ a similar roller, $p'$, which is geared by pinions $g'$ to the roller $o'$. To adjust the roller $p'$ toward the roller $o'$ by moving the sliding bearings $p$, any suitable means may be employed—such, for instance, as a screw, $r$, which bears at one end against the stationary bearing $i$, and passing at its opposite end through a screw-threaded hole, $r'$, on the bearing $p$, so that by turning the screw $r$ the roll $p'$ may be adjusted to and from the roller $o'$. A set-screw, $s^2$, may be employed for adjusting the roller $g$ toward the roller $i$.

Over the frame formed by the rollers $f\ i\ p'$ is tightly stretched a belt, $t$, of absorbent material—such as felt—and over the frame formed by the rollers $k\ m'\ o'$ is a similar belt, $t'$. This gives two endless belts, $t\ t'$, which are compelled to travel toward each other by the movement of the rollers $p'$ and $o'$, to soak up the necessary water or other fluid employed in dampening the articles. To secure a uniform quantity of moisture in the belts $t\ t'$, and just the amount necessary to dampen the articles the proper degree, the roller $m'$ is forced against the roller $l'$, so that the excess of water will be squeezed out of the belt $t'$, and the roller $g$ is forced against the roller $i$, which causes the excess of water to be squeezed from the belt $t$ as it passes between the rollers $g$ and $i$. If at any time the belts are not sufficiently tight on their frame of rollers, the difficulty may be obviated by forcing the rollers $p'$ away from the roller $i$ and the roller $m'$ from the roller $o'$ by the screws $r$ and $s$.

To drive the rollers in the proper direction with respect to each other, any suitable gearing may be employed. I have shown for this purpose each pair of rollers geared together, and on the outer ends of the rollers $l'$ $o'$ $i'$ pinions $u$ $u'$ $u^2$, which intermesh, and some one of the pinion-shafts being driven by a belt from some suitable motive power. This insures the positive rotation of all the upper rollers of the frame supporting the belts $t$ $t'$, and prevents the slipping of the latter, at the same time causing the belts to travel in opposite directions.

In operating the machine the collars or other articles to be dampened are passed between the surfaces of the belts $t$ $t'$ as they pass over the rollers $o'$ $p'$, the latter being adjusted so that they are just the right distance apart to press the required amount of moisture from the belts $t$ $t'$ into the collar or other article as it is drawn through by the downward movement of the rolls and belt. The collars pass down through the slot $e$ to a suitable receptacle, $v$, in which they can be conveyed to the ironing-machine. As a number of collars and cuffs can be passed through between the rollers $o'$ $p'$ at the same time and the apparatus works rapidly and requires but little skill in the operator, a very large amount of work can be performed by it in a comparatively short space of time.

Having now described my invention, what I claim is—

In a dampening-machine, the combination of the body $a$, having the tanks $c$ $c'$, one on each side of the same, belts $t$ and $t'$, of some absorbent material, mounted on a triangular frame of rollers, so that the belts dip down into said tanks, and the adjustable rollers for pressing the excess of moisture from said belts, substantially as and for the purpose set forth.

In testimony whereof I, the said JOSEPH M. JOHNSTON, have hereunto set my hand.

JOSEPH M. JOHNSTON.

Witnesses:
W. C. COOKE,
J. N. COOKE.